United States Patent Office.

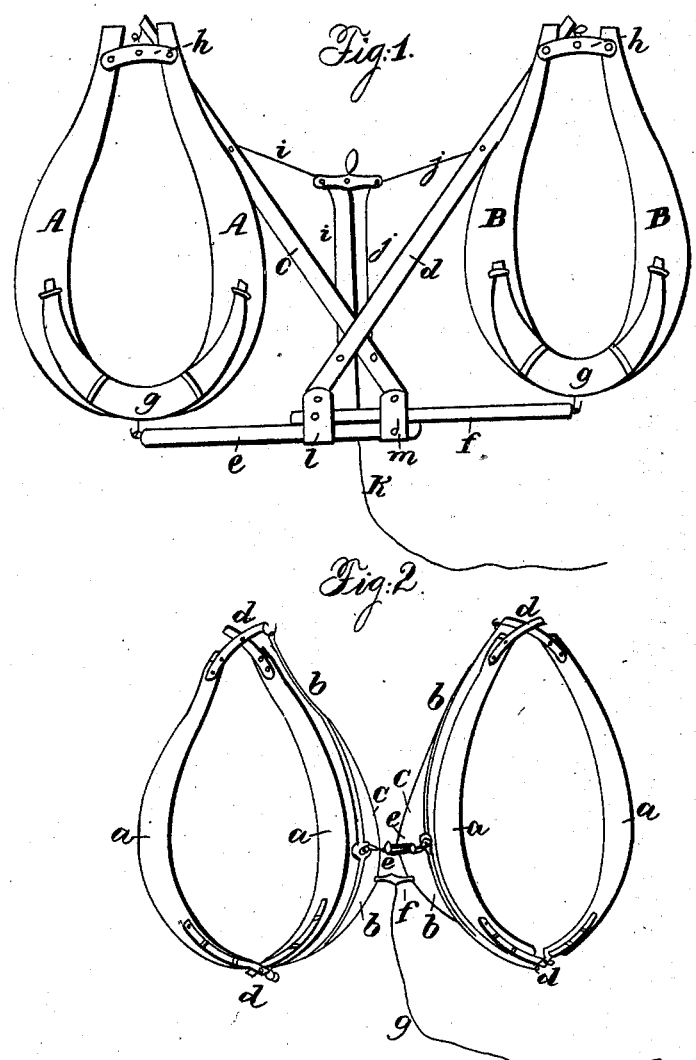

AMBROSE B. COLEMAN, OF LYNDONVILLE, NEW YORK.

*Letters Patent No. 68,699, dated September 10, 1867.*

IMPROVED DRAUGHT NECK-YOKE.

*The Schedule referred to in these Letters Patent and making part of the same.*

TO ALL WHOM IT MAY CONCERN:

Be it known that I, AMBROSE B. COLEMAN, of Lyndonville, in the county of Orleans, in the State of New York, have invented a new and useful improvement in Draught Neck-Yokes for Horses and Oxen; and I do hereby declare that the following is a full and exact description thereof, reference being had to the accompanying drawings, and the letters of reference marked thereon.

The nature of my invention consists in providing a span of horses with a cheap, light, and convenient draught neck-yoke, in which they can work in all places where horses can be worked, at the same time dispensing with whiffle-trees.

To enable those skilled in the art to make and use my invention, I will proceed to describe its construction and operation.

I construct my improved draught neck-yoke according to the accompanying drawings.

Figure 1, in the drawings, represents a front elevated view.

Letters $a$ and $b$ are the hames, which will fit on any common collar, though they may be padded, as seen on one of the hames, thus forming a hame and collar together, doing away with the necessity of any other collar.

Letters $c$ and $d$ are inclined levers, the upper ends of which are attached to the top of the hames by means of hooks in the centre of the top-hame connectings, and the lower ends, crossing each other, are attached to the slide-band $l$ and $m$.

Letters $e$ and $f$ are horizontal slide-levers, worked as follows: *i. e.*, one end of the slide-lever $e$ is attached to the bottom-hame connecting $g$, and passes through the slide-band $l$, and is fastened into the slide-band $m$ by a bolt; and the slide-lever $f$ is attached to the bottom-hame connecting $g$, and passes through the slide-band $m$, and is fastened into the slide-band $l$. Thereby the levers $f$ and $d$ and the hames $b$ move back and forth together towards the hames $a$, and the levers $e$ and $c$ and the hames $a$ move back and forth together towards the hames $b$. This arrangement permits the horses to move from and towards each other at will.

Letters $g$ and $g$ are bottom-hame connectings, made of wood or iron. They may be shaped different, and they may have a hinge in the centre.

Letters $h$ and $h$ are top-hame connectings, made of wood or iron, to hold the top of the hames together, and at the centre of which the tops of the inclined levers $c$ and $d$ are attached.

Letters $i$ and $j$ are ropes or chains. Both ends of each are fastened to the inclined levers as follows: One end of the chain $ii$ is fastened to the inclined lever $c$ near the top, and the other end to the lever $d$ near the bottom; and one end of the chain $jj$ is fastened to the inclined lever $d$ near the top, and the other end is fastened to the lever $c$ near the bottom. These chains pass through the ring of the chain $k$; or the centre of each one may be attached to the end of a short lever, in which case the chain $k$ will be attached to the centre of the short lever.

Letter $k$ is the long chain, which is worked between the horses for the purpose of drawing the load.

Letters $l$ and $m$ are the slide-bands, through which the slide-levers pass as the horses move to or from each other.

For lighter and more fancy uses I construct my yoke according to the drawings in Figure 2, the letters $a\ a\ a\ a$ being short top hames.

Letters $b$ and $b$ are draw-levers, with a hinge or joint a little below the centre, that they may bend one way and not the other. The top and bottom ends are attached to hooks on the hame connectings $d\ d\ d\ d$.

Letters $c\ c$ are straps, one end attached near the top and the other near the bottom of the draw-levers $b\ b$.

Letter $e$ are two connecting-rods, attached to the draw-levers, and slide along on each other, and are sustained there by loops, through which they pass. This permits the horses to spread and come together at will.

Letter $f$ is a short lever. Each end is attached near the centre of the straps $c\ c$.

Letter $g$ is the draw-chain, attached near the centre of the draw-chain $f$.

What I claim as my invention, and desire to secure by Letters Patent, is—

The whole of the improved draught neck-yoke as herein described in this specification and description, in the manner substantially as and for the purposes set forth.

AMBROSE B. COLEMAN.

Witnesses:
 OLES FLYNN,
 R. W. JUDSON.